Figure 1:
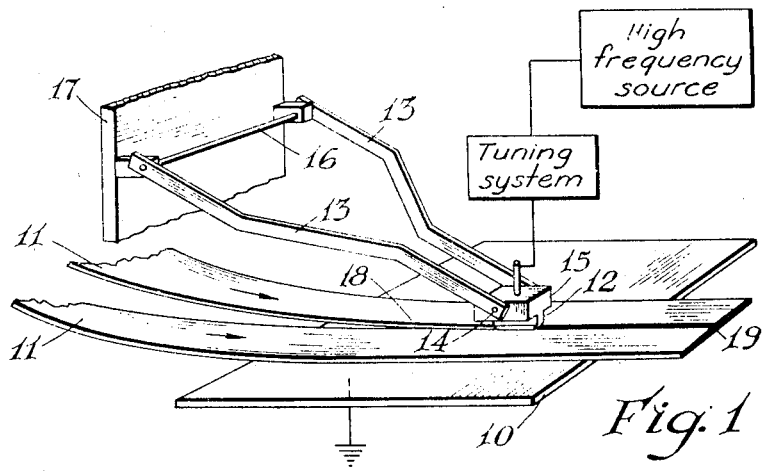

Dec. 28, 1948.   J. P. GRAHAM ET AL   2,457,659
APPARATUS FOR HIGH SPEED WELDING OF THERMOPLASTIC FILMS

Filed Sept. 19, 1946

INVENTORS.
Joseph P. Graham
BY Harold L. Hearns

Griswold & Burdick
ATTORNEYS

Patented Dec. 28, 1948

2,457,659

UNITED STATES PATENT OFFICE 2,457,659

APPARATUS FOR HIGH-SPEED WELDING OF THERMOPLASTIC FILMS

Joseph P. Graham and Harold L. Hearns, Midland, Mich., assignors to The Dow Chemical Company, Midland, Mich., a corporation of Delaware Application September 19, 1946, Serial No. 706,889

2 Claims. (Cl. 154—42)

This invention relates to improvements in apparatus for welding thermoplastic films at high speeds, and is concerned especially with specific improvements in apparatus for welding such films with a high frequency electrostatic field.

Electrostatic heating of various dielectric materials has been practiced for many years, and the publications relating to such operations are numerous. This type of heating has many well-recognized advantages, principal among which are the rapidity with which a dielectric body may be heated and the fact that such heating arises within the body of the dielectric rather than from without. Various means have been proposed for applying electrostatic heating to the welding of organic thermoplastic films, but each of those with which applicants are familiar has a number of disadvantages when it is attempted to apply them to continuous or semi-continuous production operations.

One class of apparatus heretofore proposed for the purpose employs electrostatic heating in a "sewing machine" type of film feeding device. Such machines are necessarily discontinuous in operation, in the sense that they advance the films being welded in a stepwise manner, welding being effected as a series of spots rather than as a continuous line. The linear rate of output of such machines is low, in contrast to the less advantageous but more commonly used sealing machines which apply heat externally of the film by conduction through rods or bars heated to temperatures above the fusion temperature of the film. The sewing machine type of welding apparatus is relatively very complex, having a large number of moving parts. Another disadvantage of the types of apparatus heretofore suggested for electrostatic welding of thermoplastic films is the variation in the quality of weld obtained, with variations in film thickness or variations in film speed past the welding electrodes, as well as the common failure of these types of apparatus to create a weld in the first several feet of film passing the electrodes each time operation is renewed. The latter group of disadvantages are believed due to variations in electrode temperature, and the solution which has been offered in the art is to cool the electrodes to a constant temperature below that normally attained after prolonged operation. This expedient has not been a complete answer to the prior criticisms, since it does not provide the optimum welding conditions. When high rates of production are attempted with some of the prior apparatus, the film is commonly spoiled by tearing, and is wasted.

It is among the objects of the present invention to provide an apparatus for the high speed electrostatic welding of organic thermoplastic films in either a continuous or an intermittent operation, to produce uniform strong welds without waste of or injury to the film. Another object is to provide such an apparatus which will produce strong welds in thermoplastic films at rates of 100 or more feet per minute, without injury to the film. A related object is to provide a simple apparatus having a minimum number of moving parts which will nevertheless make uniform strong welds in thin thermoplastic film at high speeds.

We have now developed an apparatus which fulfills the foregoing objects. In accordance with the present invention, the apparatus consists essentially of a fixed electrode, preferably in the form of a plate or bar, over which the film to be welded is drawn, and a vertically displaceable electrode, suspended over the first, as by a rocker arm, so as to ride on or glide over the intervening moving film. There need not be direct physical contact between the metal of the electrode and the film, and it has been found to be preferable, in some cases, to provide the electrode with a facing of paper or other non-fusible dielectric, or to supply a thin layer of oil or other dielectric lubricant to the surface of the plastic film, in which the electrode may slide. The fixed electrode is grounded, while the suspended electrode is connected to a high frequency source which, for welding most types of thermoplastic film, should operate at from 20 to 200, and usually from 20 to 60 megacycles per second. The rocker arm or other suspension of the upper electrode may be vertical, but is preferably arranged so as to make an acute angle with the path of the oncoming film. To provide a uniform linear weld, the working face of the upper electrode is chamfered to provide smoothly beveled edges and rounded corners.

For tube-forming operations, the fixed electrode may be the bed plate of a sheet-tubing machine, and the upper electrode is suspended so as to ride on the overlapped edge of the film which is drawn around and past that plate. The suspended electrode is loaded sufficiently, either by its own or added weight, or by springs, to press together the sheets being welded, while the inner surfaces of these films are momentarily fused. For other linear welds the pair of electrodes is arranged in any convenient manner so that the two film portions to be welded are drawn between the smooth fixed electrode and the suspended electrode. In any such operations, the production rate of welded film is to a certain extent dependent upon the length of the suspended bar electrode. Speeds of 100 feet or more per minute are easily obtained in film welding operations with the present simple electrode arrangement, when using an upper electrode about 2 inches long and operating on film about 2 mils thick.

A further improvement contemplated by the present invention consists of a temperature control system incorporated in either of the electrodes, and preferably and most conveniently in the fixed electrode. In operation with most thermoplastic films, the electrodes of the present apparatus attain temperatures which vary considerably but do not ordinarily exceed about 40° C. It is impractical if not impossible to regulate the temperature by controlled cooling operations, though cooling is the means of control heretofore recommended for the electrodes in electrostatic heating equipment. We have now found that the electrodes, or one of them, may be maintained with advantage at a reasonably fixed temperature above that normally attained by the electrodes in electrostatic film welding operations, suitably between 50° and 80° C., but considerably below the softening point of the film, and below the heat distortion point of the film. This may be done conveniently by attaching to or inserting in such electrode an electric resistance heater which is thermostatically controllable within 5 degrees of the desired temperatures, by known means. Despite prior recommendations to cool the electrodes, we have found that the production rate is actually increased by heating them (one or both) to the suggested elevated temperature, and that uniformity of the resulting welds is greater than when the electrodes are cooled or when they are merely allowed to operate at their autogenous temperature. Variations in film speed and film thickness, which might affect the temperature of an ordinary electrode, and hence would affect the voltage requirements for maintenance of proper welding conditions, are without material significance when the electrode is thermostatically controlled at a higher than normal temperature, as in the present invention.

The invention is not limited to apparatus for making continuous linear welds. Thus, the suspended electrode may be intermittently raised from and lowered into contact with the work, to produce discontinuous welds, as in the sealing of a series of individual film bags or envelopes. Similarly, two sets of electrodes may be used in tandem, one set being disposed with the upper electrode transverse to the direction of travel of the films, and operating intermittently, while the other set is disposed with the upper electrode suspended in sliding contact with the work to make a continuous linear weld. Either or both of the lower electrodes may be heated as described above. Such an arrangement may be used, for example, to make a connected series of sealed pouches from a single folded sheet of film in the style sometimes used in the series packaging of individual pills or confections.

Figure 2:
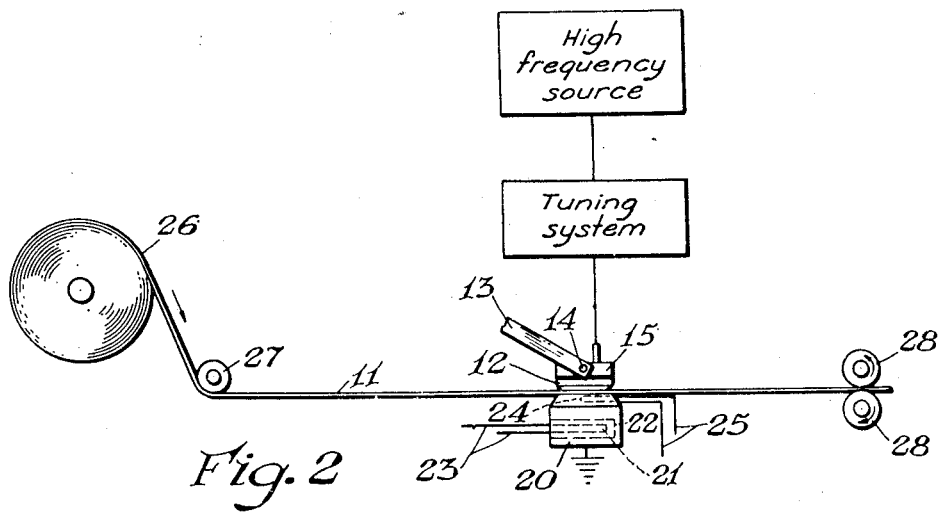

The novel features of the present invention may be understood more readily by reference to the accompanying drawing, wherein Fig. 1 is a perspective view of one form of the apparatus of this invention, in operation on lapped edges of two film sheets, the thickness of the latter being greatly exaggerated; and Fig. 2 is a partially diagrammatic view, in elevation, showing a preferred modification of the lower electrode for use in the invention.

Referring to Fig. 1, the apparatus has an electrically grounded fixed bed-plate or lower electrode 10, over or around which may be drawn the film 11 to be welded. An upper electrode 12 is suspended from supporting arms 13 over plate 11 by means of pivot pin 14, and is electrically connected with a high frequency source, through a tuning system of known type (either variable capacity or variable inductance). Electrode 12 is insulated from supporting arms 13 by means of an interposed insulator 15, such as a block of polystyrene or of ceramics. Arms 13 are in turn pivoted, as on axle 16 from a fixed support 17. In operation, lapped edges 18 of film 11 are drawn, by means not shown, over plate 10 and under electrode 12, and a continuous linear weld 19 is produced.

In the modification illustrated in Fig. 2, the lower electrode 20 is heated, as by a cartridge type of resistance heater 21 in socket 22, connected with an electrical source by lead-wires 23. Electrode 20 is also provided with a thermocouple 24, which is connected by lead-wires 25 to a thermostatic means, not shown, for controlling the flow of current through wires 23 and heater 21, so as to maintain the temperature of the working face of electrode 20 at a preselected value between about 50° and about 80° C. In operation, this modification performs as does that previously described, but produces more uniform welds and permits higher operating speeds, due to the described temperature control. Film 11 is unwound from one or more supply reels 26, under an idler tension roll 27 and is drawn between electrodes 12 and 20 by driven rolls 28, with two lapped edges of such film being presented for welding in the electrostatic field between the said electrodes.

In a specific example, lapped edges of a film of a plasticized copolymer of about 90 per cent vinylidene chloride and about 10 per cent vinyl chloride, having a single thickness of about 2 mils, were drawn over a flat plate grounded electrode 10 and under a suspended bar electrode 12 having a working face in sliding contact with the upper layer of film about 0.188 inch wide and about 2 inches long. This electrode exerted a pressure of about 4 pounds per square inch of electrode surface, on the film, and was connected wth a high frequency source tuned to 30 megacycles per second. A continuous linear weld, about 0.125 inch wide was formed between the lapped films as they were drawn past the electrodes at a rate of about 85 feet per minute. By way of contrast, the maximum rate of output of welded film, when operating on the same film stock with two commercially available electronic "sewing machine" type of welders was, in one case, 8 feet, and in the other case, 25 feet per minute, with recommended operation of the two machines being from 5 to 8 and from 15 to 25 feet per minute, respectively. A commercial sealing unit, operating by transfer of heat through the films from external sources, could be operated on this film at a limiting rate of 40 feet, with 25 feet per minute being recommended. These various commercial machines operate at rates up to 30–40 feet per minute on films of other plastic materials. In operations carried out with the film described in the above example and having a fusion temperature of about 175° C., using the apparatus illustrated in Fig. 2 with the lower electrode 20 thermostatically controlled near 55° C., welding speeds up to 110 feet per minute have been obtained. This was the limit speed of drawing rolls 28, and greater speeds may well be possible, while still producing the continuous linear weld of uniform width and strength which is the characteristic product of this apparatus, by increasing the length of the upper electrode and by speeding up the drawing rolls. In continuous operation with this same apparatus, but without supplying heat to the lower electrode, the latter attained a temperature between 35° and 40° C.

The new apparatus has been illustrated and described, for convenience, as having a fixed lower electrode and a suspended upper electrode. It should readily be apparent that these positions may be reversed, with the fixed electrode above and the displaceable electrode beneath, in which case the latter may be spring loaded to hold the film snugly against the fixed electrode. Occasion may even arise to provide a pair of electrodes capable of operating on lapped films drawn through the apparatus in a vertical plane. Such modifications of the apparatus are deemed to be equivalents of the one shown and described, and are included within the ambit of the annexed claims.

The apparatus of the invention is especially advantageous when used with films which tend to shrink badly when heated, such as the copolymer mentioned above or rubber hydrochloride, and in such operation it produces wrinkle-free welds, in contrast to those made by a welding apparatus which applies heat externally of the film. This advantage is due in large part to the rapidity with which the film is drawn away from the welding zone, when using the new apparatus. The invention is not limited in its operation to the films specifically suggested, as it has been employed on a variety of thermoplastic films, and it has been found that it may be used on any weldable thermoplastic film in thicknesses up to 10 mils or more, with the advantages noted.

We claim:

1. In an apparatus for the electrostatic welding of organic thermoplastic films, a grounded fixed electrode presenting a smooth surface to the work, controlled means to heat said electrode to a fixed temperature which is in the range from 50° to 80° C. and is below the heat distortion temperature of the film to be welded, a displaceable suspended electrode co-operative therewith to press the work therebetween and connected electrically to a high frequency source, and means for advancing lapped films between and in sliding contact with both said electrodes.

2. In an apparatus for the electrostatic welding of organic thermoplastic films, a grounded fixed lower electrode presenting a smooth surface to the work, controlled means to heat said electrode to a fixed temperature which is in the range from 50° to 80° C. and is below the heat distortion temperature of the film to be welded, a vertically displaceable suspended upper electrode co-operative therewith to press the work therebetween and connected electrically to a high frequency source, and means for advancing lapped films between and in sliding contact with both said electrodes, the upper electrode being shaped so as to present a smooth narrow face to the work.

JOSEPH P. GRAHAM.
HAROLD L. HEARNS.

REFERENCES CITED

The following references are of record in the file of this patent:

UNITED STATES PATENTS

| Number | Name | Date |
|---|---|---|
| 2,256,506 | Wagner | Sept. 23, 1941 |
| 2,360,950 | Kilgour | Oct. 24, 1944 |

OTHER REFERENCES

Electronics, Aug. 1943, pp. 90 to 93 and 160 to 168.